(12) United States Patent
Thomas et al.

(10) Patent No.: US 9,036,173 B2
(45) Date of Patent: May 19, 2015

(54) METHODS AND SYSTEMS TO TROUBLESHOOT MALFUNCTIONS IN MULTIFUNCTION DEVICES USING A WIRELESS HANDHELD DEVICE

(75) Inventors: David Andrew Thomas, Bucks (GB); Martin Richard Walsh, Herts (GB)

(73) Assignee: Xerox Corporation, Norwalk, CT (US)

( * ) Notice: Subject to any disclaimer, the term of this patent is extended or adjusted under 35 U.S.C. 154(b) by 695 days.

(21) Appl. No.: 13/094,888

(22) Filed: Apr. 27, 2011

(65) Prior Publication Data
US 2012/0274962 A1    Nov. 1, 2012

(51) Int. Cl.
| | | |
|---|---|---|
| G06K 15/00 | (2006.01) | |
| G06F 3/00 | (2006.01) | |
| G06F 3/12 | (2006.01) | |
| G03G 15/00 | (2006.01) | |
| H04N 1/00 | (2006.01) | |
| H04N 1/46 | (2006.01) | |
| H04N 1/32 | (2006.01) | |
| G06F 9/44 | (2006.01) | |

(52) U.S. Cl.
CPC ....... *H04N 1/00015* (2013.01); *H04N 1/00018* (2013.01); *H04N 1/00029* (2013.01); *H04N 1/00053* (2013.01); *H04N 1/00058* (2013.01); *H04N 1/00079* (2013.01); *H04N 1/00307* (2013.01); *H04N 1/3263* (2013.01); *H04N 1/32635* (2013.01); *H04N 1/32662* (2013.01); *H04N 1/32667* (2013.01); *H04N 2201/0055* (2013.01); *H04N 2201/0096* (2013.01); *H04N 2201/0094* (2013.01); *H04N 2201/0082* (2013.01); *G06F 9/4446* (2013.01)

(58) Field of Classification Search
USPC .............. 358/1.12–1.15, 1.16, 404, 405, 406, 358/504; 101/484; 399/1, 9, 11, 12, 13, 21, 399/81; 710/15, 18, 19, 20
See application file for complete search history.

(56) References Cited

U.S. PATENT DOCUMENTS

| | | | | |
|---|---|---|---|---|
| 7,899,902 | B2 * | 3/2011 | Hyotani et al. ................ | 709/224 |
| 8,010,323 | B2 * | 8/2011 | Naito ............................. | 702/189 |
| 8,040,542 | B2 * | 10/2011 | Oda et al. ...................... | 358/1.14 |
| 8,305,607 | B2 * | 11/2012 | Morohoshi ................... | 358/1.15 |
| 8,472,053 | B2 * | 6/2013 | Aoki ............................. | 358/1.15 |
| 8,559,030 | B2 * | 10/2013 | Tsongas et al. ............... | 358/1.14 |
| 8,621,362 | B2 * | 12/2013 | Castellani et al. ............ | 715/740 |
| 2009/0190187 | A1 * | 7/2009 | Cornell et al. ................ | 358/474 |
| 2009/0237546 | A1 * | 9/2009 | Bloebaum et al. ........ | 348/333.01 |
| 2010/0304787 | A1 * | 12/2010 | Lee et al. ................... | 455/556.1 |
| 2012/0019858 | A1 * | 1/2012 | Sato ............................. | 358/1.15 |

* cited by examiner

*Primary Examiner* — Jonathan R Beckley
(74) *Attorney, Agent, or Firm* — Novel IP

(57) ABSTRACT

The present specification discloses systems and methods for enabling users to troubleshoot multifunction devices using handheld devices, such as mobile phones. In one embodiment, software executing on the handheld device receives data indicative of an error state in a multifunction device, causes the handheld device to obtain and display an image representative of an area of the multifunction device which would need to be serviced to address the error state, determines instructions for addressing the error state, and causes the handheld device to display the instructions in relation to the image representative of an area of the multifunction device.

20 Claims, 15 Drawing Sheets

METHODS AND SYSTEMS TO TROUBLESHOOT MALFUNCTIONS IN MULTIFUNCTION DEVICES USING A WIRELESS HANDHELD DEVICE

FIELD

The present specification relates generally to multifunction devices such as printers and copiers, and more particularly, to a technique for clearing jams using wireless handheld devices.

BACKGROUND

Multifunction devices such as copiers, printers, scanners etc provide a user interface that can be used to provide instructions to the user for troubleshooting common errors, such as a paper jam. Conventionally, such multifunction machines are designed such that troubleshooting instructions are displayed on a user interface located at the top of the machine. Often, however, due to the construction of such devices, problems must be addressed by opening the machine from the bottom or the front. For example, in case of a paper jam, the actual jam clearing process involves accessing the components inside the machine from either below or the front of the machine. This necessitates the user, who is trying to troubleshoot the problem, to look up and down again and again in order to be able to read the instructions and execute them and, further, to mentally map the troubleshooting directions, located on a simple interface, to the physical components, the relating of which may be very difficult.

Further, multifunction devices are being designed today to be increasingly compact and to occupy the least floor space or "footprint". This makes access to internal components of the machine even more complicated for a user. Thus, for example, a compact paper path of a printer poses a greater challenge to a user for clearing jams of print media sheets, which may be stopped or jammed in various locations along the paper path. Likewise, tech representatives or other repair personnel have more restricted manual access to removal or repair of internal components that are more closely crowded together in compact printer designs.

Because of the problems encountered by general office workers in addressing such common errors, there is often a call for unplanned maintenance. This results in a cost to the product supplier as well as the user, causing unnecessary downtime.

There is therefore a need for a method and system that enables a frequent, non-technical user to easily clear jams and solve other common problems which may occur in the operation of a multi-functional device. Such a system should make the problem solving instructions more comprehensible to printer users and should also be able to provide clear views of the jammed machine.

SUMMARY

In one embodiment, the present specification discloses a computer readable medium storing a plurality of programmatic instructions adapted to be executed on a handheld device, wherein said plurality of programmatic instructions comprise routines for receiving data indicative of an error state in a multifunction device; routines for causing said handheld device to display an image representative of an area of the multifunction device which would need to be serviced to address said error state; routines for determining a plurality of instructions for addressing said error state, wherein said instructions comprise at least one of audio data, video data, text data, or graphical data; and routines for causing said handheld device to display said plurality of instructions in relation to said image representative of an area of the multifunction device.

In another embodiment, the present specification discloses a computer readable medium storing a plurality of programmatic instructions adapted to be executed on a handheld device, wherein said plurality of programmatic instructions comprise: routines for receiving data indicative of an error state in a multifunction device; routines for prompting a user to activate said handheld device to capture a first image representative of an area of the multifunction device which would need to be serviced to address said error state; routines for obtaining from a memory a second image representative of an area of the multifunction device which would need to be serviced to address said error state; routines for causing said handheld device to concurrently display said first image and said image; routines for determining a plurality of instructions for addressing said error state, wherein said instructions comprise at least one of audio data, video data, text data, or graphical data; and routines for causing said handheld device to display said plurality of instructions in relation to said first image and said second image.

Optionally, the routines for receiving data indicative of the error state comprise routines for causing said handheld device to wirelessly communicate with said multifunction device and to obtain said data indicative of the error state from said multifunction device. The memory is at least one of a memory local to said handheld device, a memory local to said multifunction device, or a memory remote from said handheld device and said multifunction device and accessible via a network communication. The data indicative of the error state comprises at least one of an error code, a type of multifunction device, or a type of error.

Optionally, the handheld device captures the first image using a camera integrated into the handheld device. The routines for causing said handheld device to display said plurality of instructions in relation to said first image and said second image cause said handheld device to overlay at least one of said text data or graphical data on said first and said second image. The routines for obtaining from a memory a second image representative of an area of the multifunction device which would need to be serviced to address said error state comprise routines for retrieving a graphical image of the area of multifunction device, which would need to be serviced to address said error state, wherein said graphical image is stored in a database.

Optionally, the graphical image is retrieved by analyzing the first image and identifying at least one graphical image in the database corresponding to said first image. The graphical image is retrieved by using said data indicative of the error state and querying the database for a graphical image associated with said error state. The routines for causing said handheld device to display said plurality of instructions in relation to said first image and said second image cause said handheld device to overlay at least one of said text data or graphical data on said graphical image.

Optionally, the computer readable medium further comprises routines for validating a completed instruction after a user confirms a completion of an instruction. The routines for validating a completed instruction prompt said user to capture a visual image of the area of the multifunction device being serviced using a camera integrated into the handheld device, obtain said visual image, analyze the visual image, and determine if said completed instruction was performed properly based upon said visual image.

Optionally, the error state is a sheet of paper being jammed within the multifunction device. The concurrent display comprises overlaying the first image atop the second image or overlaying the second image atop the first image.

In another embodiment, the present specification discloses a method of instructing a user to troubleshoot a malfunction in a multifunction device using a handheld device, wherein said handheld device executes a plurality of programmatic instructions, comprising: receiving data indicative of a malfunction in a multifunction device; prompting a user to capture a first image representative of an area of the multifunction device which would need to be serviced to address said malfunction; obtaining from a memory a second image representative of an area of the multifunction device which would need to be serviced to address said malfunction; causing said handheld device to concurrently display said first image and said image, wherein said concurrent display comprises at least one of overlaying the first image atop the second image or overlaying the second image atop the first image; determining a plurality of instructions for addressing said malfunction, wherein said instructions comprise at least one of audio data, video data, text data, or graphical data; and causing said handheld device to display said plurality of instructions in relation to said first image and said second image.

Optionally, receiving data indicative of the error state is performed by causing said handheld device to wirelessly communicate with said multifunction device and to obtain said data indicative of the malfunction from said multifunction device. The memory is at least one of a memory local to said handheld device, a memory local to said multifunction device, or a memory remote from said handheld device and said multifunction device and accessible via a network communication. The handheld device captures the first image using a camera integrated into the handheld device.

Optionally, the method further comprises overlaying at least one of said text data or graphical data on said first and second image. Obtaining from the memory the second image comprises retrieving a graphical image of the area of multifunction device, which would need to be serviced to address said malfunction, wherein said graphical image is stored in a database. The method further comprises retrieving the graphical image by analyzing the first image and identifying at least one graphical image in the database corresponding to said first image. The method further comprises retrieving the graphical image by using said data indicative of the malfunction and querying the database for a graphical image associated with said malfunction. The method further comprises overlaying at least one of said text data or graphical data on said graphical image.

Optionally, the method further comprises validating a completed instruction after a user confirms a completion of an instruction. The method further comprises prompting said user to capture a visual image of the area of the multifunction device using a camera integrated into the handheld device, analyzing the visual image, and determining if said completed instruction was performed properly based upon said visual image.

The aforementioned and other embodiments shall be described in greater depth in the drawings and detailed description provided below.

BRIEF DESCRIPTION OF THE DRAWINGS

These and other features and advantages will be appreciated as they become better understood by reference to the following Detailed Description when considered in connection with the accompanying drawings, wherein.

Figure 1:
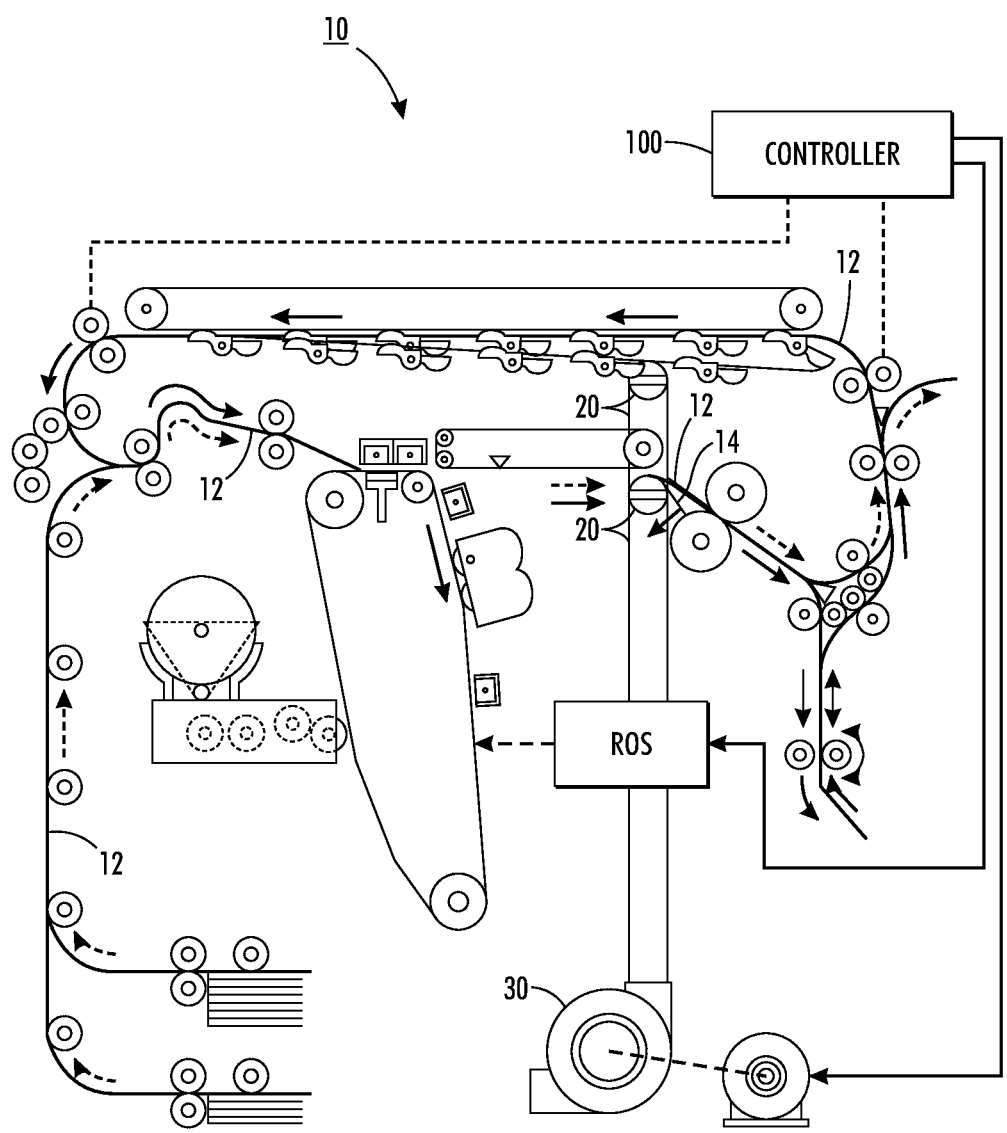
FIG. 1 illustrates an exemplary paper path of a multifunction device.

In the figures, the first digit of any three-digit number generally indicates the number of the figure in which the element first appears.

DETAILED DESCRIPTION

The present specification describes methods and systems that simplify the process of troubleshooting common errors in multifunction devices. In one embodiment, the method comprises capturing the image of the jammed device and its components using a camera built in a handheld smart device. The handheld device then overlays the captured image with computer generated images to provide instructions to the user to clear the jam. Since the instructions are accompanied by images of the actual jammed device, the user can easily visually relate to the instructions and solve the problem.

It should be appreciated that the methods and systems are being described with respect to specific embodiments, but are not limited thereto. The present specification is directed towards multiple embodiments. The following disclosure is provided in order to enable a person having ordinary skill in the art to practice the claimed embodiments. Language used in this specification should not be interpreted as a general disavowal of any one specific embodiment or used to limit the claims beyond the meaning of the terms used therein. The general principles defined herein may be applied to other embodiments and applications without departing from the spirit and scope of the claimed embodiments. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that are known in the technical fields related to the claims have not been described in detail so as not to unnecessarily obscure the claimed embodiments.

As used herein, the term 'multifunction device' or 'device' is defined as any machine that can operatively perform at least one of the following functions: printing, scanning, transmitting or receiving facsimiles, or copying. The term 'handheld device' includes any smart device having a processor and a memory, such as a mobile phone, smart phone, PDA, laptop, tablet PC or a dedicated handheld device. The term 'error', 'error state', or 'malfunction' includes any state of the device in which it no longer operates as intended and/or requires human intervention to address in order to return the device to a normal operating condition. It should be appreciated that the application being executed on the handheld, as described herein, comprises a plurality of instructions or routines stored on a computer readable medium in the handheld's memory and executed on the handheld processor. In another embodiment, the routines are stored on a computer readable medium associated with the multifunction device. In another embodiment, the routines are stored on a computer readable medium on a server or another computer in a network, with the handheld device and/or the multifunction device being in communication with the network.

Referring to FIG. 1, the illustrated printer 10 is merely one example of many types of multifunction devices, having a paper path 12. Print media sheets to be printed pass through and out of the printer 10 along the paper path 12. For illustration of one example of the advantages of the subject modification of the printer 10 there is shown an exemplary sheet jam clearance baffle 14, forming part of the exemplary paper path 12. It is typical and well known for such baffles, or other movable or repositionable printer components, to define the normal paper path 12 during normal printing operation. An air duct 20 is located close to the baffle 14 so as to conserve internal machine space. This air duct 20 may be supplied with relatively low positive pressure air in a conventional manner by using an electric motor driven blower 30, as schematically illustrated.

When certain printing machine failures occur, such as an unintended paper jam, the printer 10 is stopped or cycled down automatically through a machine stoppage signal from the controller 100. The operator then typically opens exterior covers of the printer and reaches in to manually remove sheets from one or more locations along the paper path. This is illustrated in this example by the phantom open position of the baffle 14. The location of sheet jam detectors (sensors) along a printer paper path is also well known in the art and need not be re-described herein.

From FIG. 1, it would be apparent to one of ordinary skill in the art that a general office user, not technically qualified to handle such devices may not always be able to understand where the jam has occurred, and how to clear it. Further, jam clearance instructions if any provided by the device, are mostly provided on the top of device, whereas the user needs to open the machine from front or below. Therefore, in order to provide the user a clear view of the jammed area of machine, as well as to provide jam clearance instructions which are easier to understand, in one embodiment the present system uses a handheld device with imaging capability to capture the image of the jammed device or its components. The handheld device can be any device that has a camera, a display, a processor and memory with suitable software. The software is used to overlay computer generated images with the actual images of the jammed device captured by the camera, and to accordingly display appropriate troubleshooting instructions. The software also has the ability to interpret alarms, and to monitor a user's progress during troubleshooting.

Figure 2:
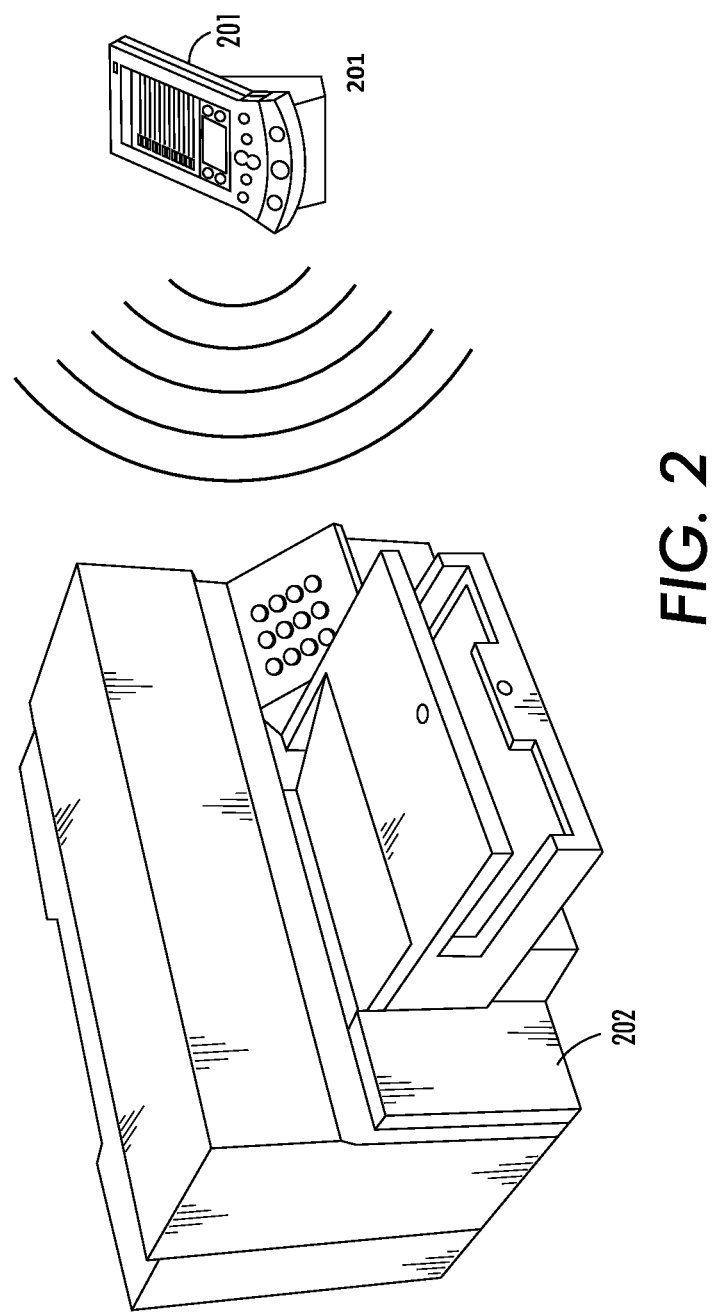
FIG. 2 illustrates exemplary wireless communication between a multifunction device and handheld device.

FIG. 2 provides an exemplary illustration of one embodiment, wherein the handheld device 201 wirelessly communicates with the multifunction device 202. The handheld device 201 may communicate using Bluetooth, infrared, radio frequency, WiFi, or any other wireless standard or medium known in the art. In one embodiment, device 202 is also equipped with a docking station (not shown) where the handheld device 201 is normally placed, and can be removed by the user for assistance when faced with a problem. In one embodiment, the handheld device 201 is a smart device customized for the purpose of providing troubleshooting assistance for a specific multifunction device. Further, in one embodiment the handheld device 201 is always in communication with the multifunction device 202, and alerts the user in case of a problem.

In another embodiment, the handheld device is a mobile phone. One of ordinary skill in the art would appreciate that for the present purpose, the mobile phone comprises hardware and operating system suitable for the application and is preferably equipped with a camera. In this embodiment, software for overlaying images and displaying appropriate instructions, interpreting alarms and keeping track of user's progress is provided as an application that can be downloaded into the mobile phone. The software application is provided by the manufacturer of the multifunction device, and may be available for download, for example, from the manufacturer's website, a third party website, or the mobile phone provider's website. One of ordinary skill in the art would appreciate that in this case any user with a suitable mobile phone can download the application and use it for troubleshooting—that is, a dedicated device is not required for the purpose. When a user encounters an error in the multifunction device, he or she can activate the application on their mobile phone. The application communicates with the device to understand the error and instructs the user accordingly.

Figure 3:
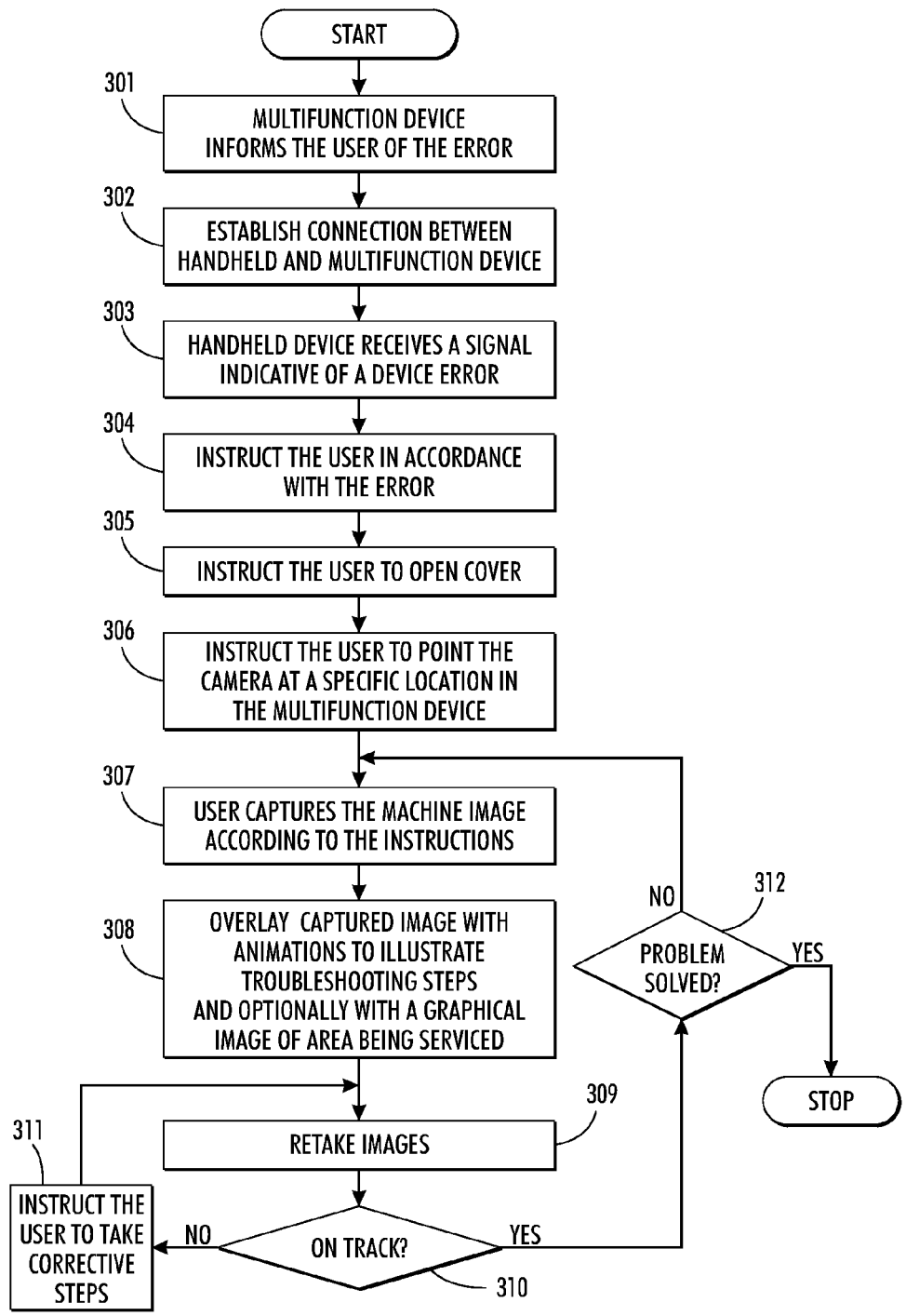
FIG. 3 illustrates an exemplary flow chart for instructing a user to troubleshoot a multifunction device using a handheld device.

FIG. 3 illustrates an exemplary series of steps that, when performed, enable a user to troubleshoot a multifunction device using the handheld device when a problem is encountered with the multifunction device. FIGS. 4A-4I reflect the execution of those steps in the form of exemplary graphical user interfaces presented within a display of a handheld device.

The user interface on the machine informs 301 the user of the error and the nature of the problem. The user then takes the handheld, launches the troubleshooting application associated with the multifunction device, and establishes a connection 302 with the multifunction device. It may be noted that this step is not required if the handheld device is a dedicated one that docks with the multifunction device, as explained earlier. In this case the dedicated handheld is always in communication with the multifunction device.

If the handheld is a mobile phone, connection can be established with the multifunction device by launching the requisite application, which then establishes communication between the phone and the multifunction device. It may be noted that the application in the user's mobile phone can be configured to work with different multifunction devices. In one embodiment, after the user installs the application, the user can configure the application to assist in the troubleshooting of a device by a) placing the handheld application in communication with the device, such as via a discovery process using Bluetooth or other wireless protocol, and b) activating a configuration process in which the device communicates its identity, preferred methods of communication, alarm states, troubleshooting data, or other such configuration information. In another embodiment, the application allows the user to manually choose the device type from a list, generated from pinging all multifunction devices configured to communicate over the same wireless networks using a conventional wireless discovery process, such as Bluetooth, after which the application configures itself automatically.

Figure 4A:
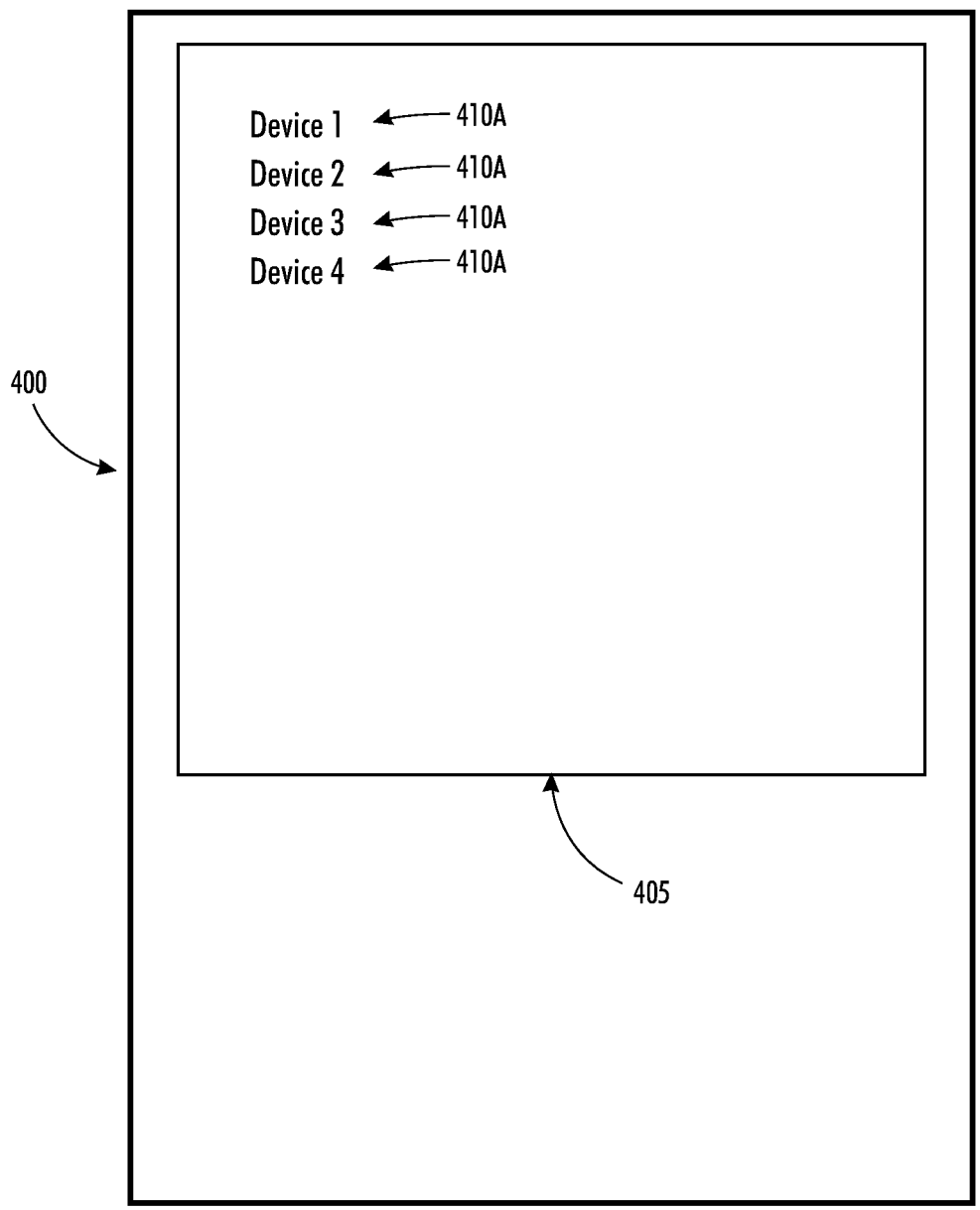
FIG. 4A is an exemplary embodiment of a first graphical user interface.

Referring to FIG. 4A, the handheld device 400 is activated, using a keyboard or touch screen interface, to present on a display 405 a troubleshooting application that launches and displays a list of multifunction devices 410A with which the handheld device is pre-configured to communicate. A user may select a specific multifunction device and initiate a connection therewith.

Once in data communication with the multifunction device, the handheld device receives 303 a signal containing data indicative of the problem detected by the multifunction device. It should be appreciated that a conventional multifunctional device is already configured to detect and determine an internal error occurring in the operation of the device. In one embodiment, the multifunction device is equipped with a transmitter which can wirelessly communicate a signal containing data indicative of the error or a transmitter which, via wired or wireless connection, communicate a signal containing data indicative of the error to a remotely located server or other computing device, which, in turn, can relay that signal, or another signal derived therefrom, to the handheld device.

Figure 4B:
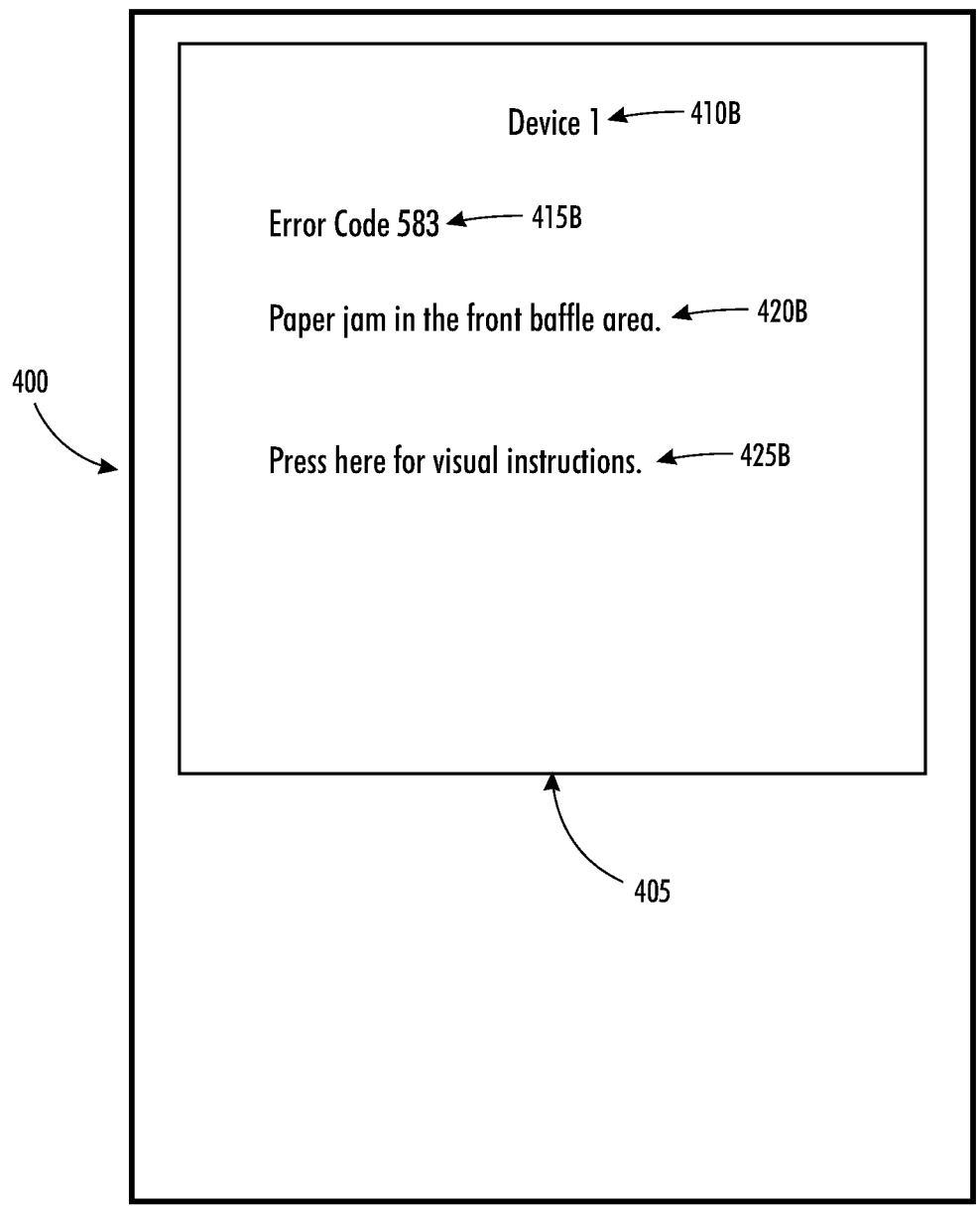
FIG. 4B is an exemplary embodiment of a second graphical user interface.

Referring to FIG. 4B, the display 405 preferably shows the device to which the handheld 400 is communicating and/or for which the handheld 400 is attempting to assist in the troubleshooting. The device is denoted in a first area 410B, along with the error code 415B, a word description of the error code 420B, and an option for receiving step-by-step visual instructions by pressing a button or icon 425B. It should be appreciated that the error code 415B and description of the detected error 420B may be received from the device, as described above, in real time when the handheld is being used to troubleshoot the device or may be looked up in a database local to or remote from the handheld in response to the handheld receiving a signal indicative of the nature, type, scope, or defining characteristic of the error from the device. In one embodiment, the database is downloaded into the handheld device at the time the software application is installed. In one embodiment, the software application in the handheld is configured to provide assistance in service routines for the multifunction device, in addition to handling common errors.

It should also be appreciated that the handheld device may not communicate directly with the multifunction device. Rather, a user may launch the application on the handheld and, once launched, be prompted to capture, via a camera built into the handheld, an indicator displayed on the multifunction device which can be used by the application to access the nature and type of the device, as well as the nature and type of the error which has occurred. The multifunction device can display a bar code, a set of alphanumeric characters, or other images, that, once captured or otherwise input into the application, can be used to access a) the specific type of multifunction device, b) the specific error being experienced, and/or c) one or more graphics that, when displayed, can be used to explain how to troubleshoot the error by transmitting the data to a local database or a remote database via a network. Alternatively, the code can be inputted into the application via conventional handheld input mechanisms, such as a keyboard, touchscreen, or by voice recognition.

Figure 4C:
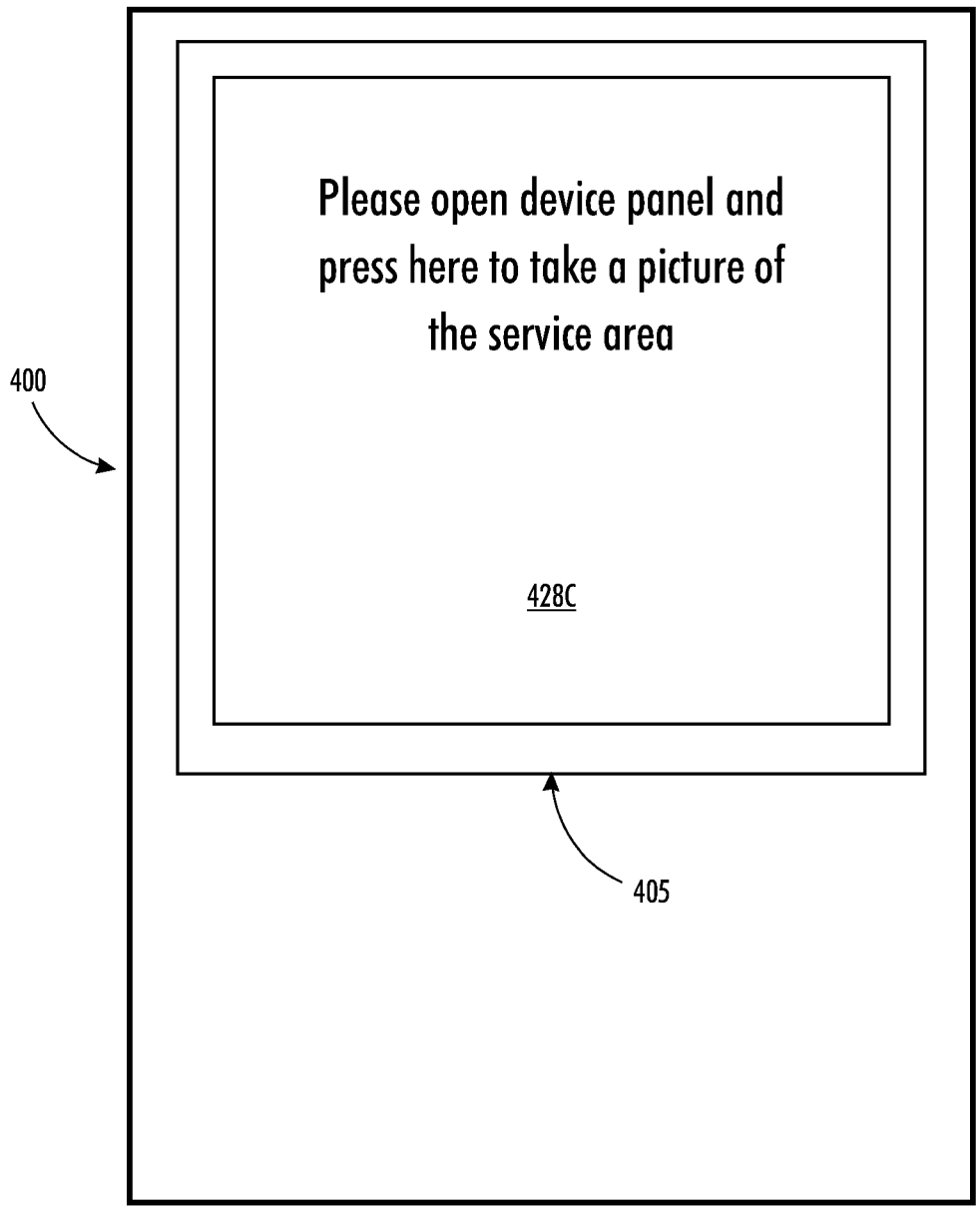
FIG. 4C is an exemplary embodiment of a third graphical user interface.
Figure 4D:
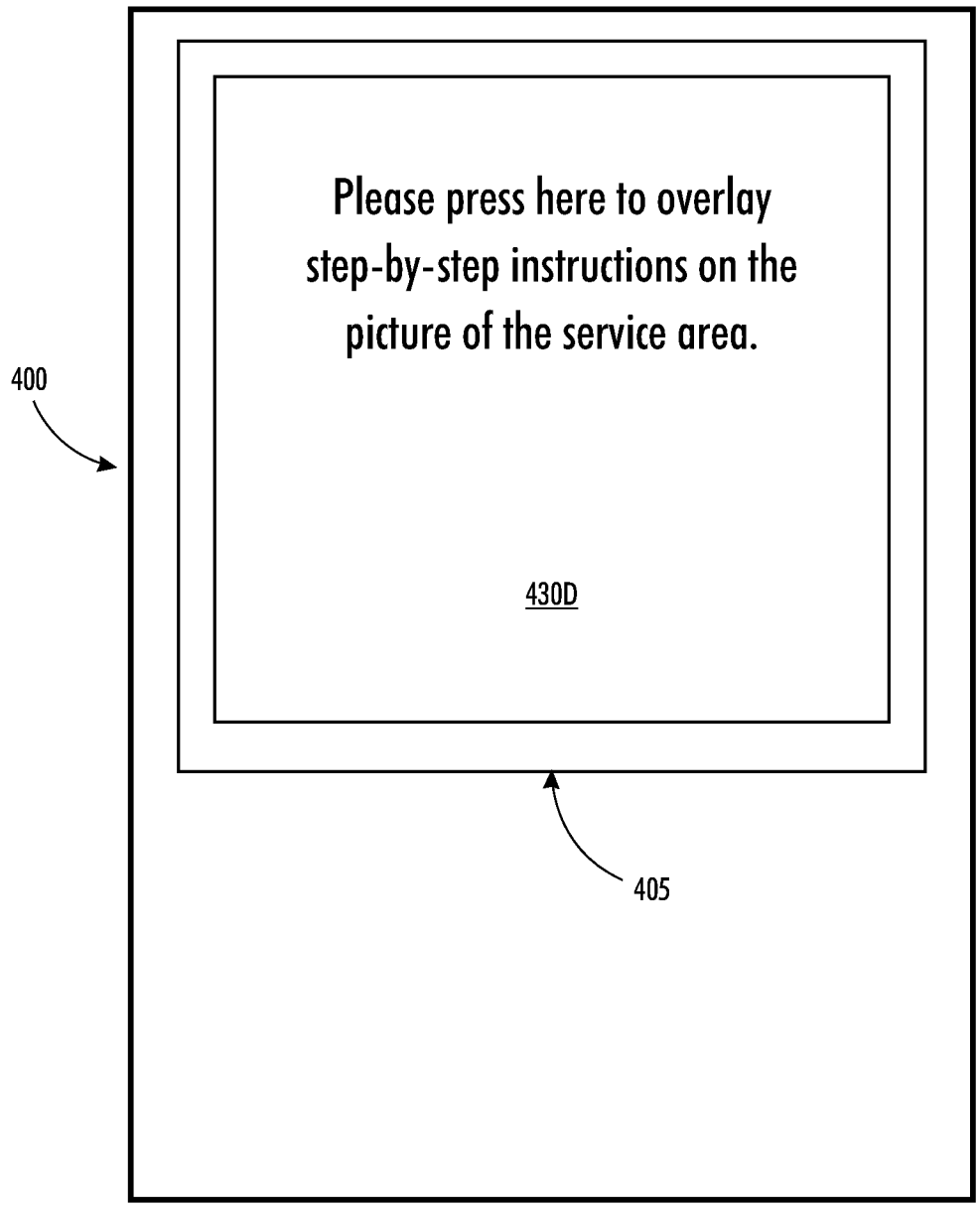
FIG. 4D is an exemplary embodiment of a fourth graphical user interface.

Referring back to FIG. 4B, assuming a user presses the icon for visual step-by-step instructions 425B, the handheld device initiates 304 the process of instructing a user to address the detected error by displaying an instruction to open 305 the multifunction device cover and take a picture of the service area, namely the exposed portion of the device machinery, as further shown in display 428C in FIG. 4C. The display 405 may instruct 306 a user to point the handheld, having a camera built in thereto, to a particular reference point within the device, such as physical marker. In one embodiment, one or more physical markers are placed on the internal components of the multifunction device. For example, components may be marked numerically as 1, 2, 3, 4, . . . 10, or alphabetically. The graphical user interface (GUI) on the display 405 can instruct the user to point the camera at physical marker 3 or 5 located within the multifunction device. In one embodiment, to assist the user in focusing correctly at the desired component, the GUI presents a square or a circle on the camera screen, and instructs the user to point the camera such that the marking of the component (3 or 5, etc.) is centered within the square or circle.

The user activates the handheld to capture 307 the multifunction device image according to the instructions. The application operating on the handheld 400 presents a user with an option, as shown in GUI 430D in display 405, to overlay step-by-step instructions on the captured picture of the service area or on a graphic of the service area, which may be retrieved based upon said captured picture. For example, the captured image may be used to determine a plurality of different characteristic features of the service area, using conventional image recognition processes, and then match those identified characteristic features to a database of graphical images. The corresponding graphical image may then be retrieved and transmitted or otherwise provided to the application. Alternatively, an actual image of the captured area may not be required to retrieve a graphic. Instead, a graphic may be retrieved from a database based upon the device type and the type of error that has occurred. Using the device type and error code, a corresponding graphic for the affected service area, which is stored in a flat table or relational database, may be retrieved.

Figure 5A:
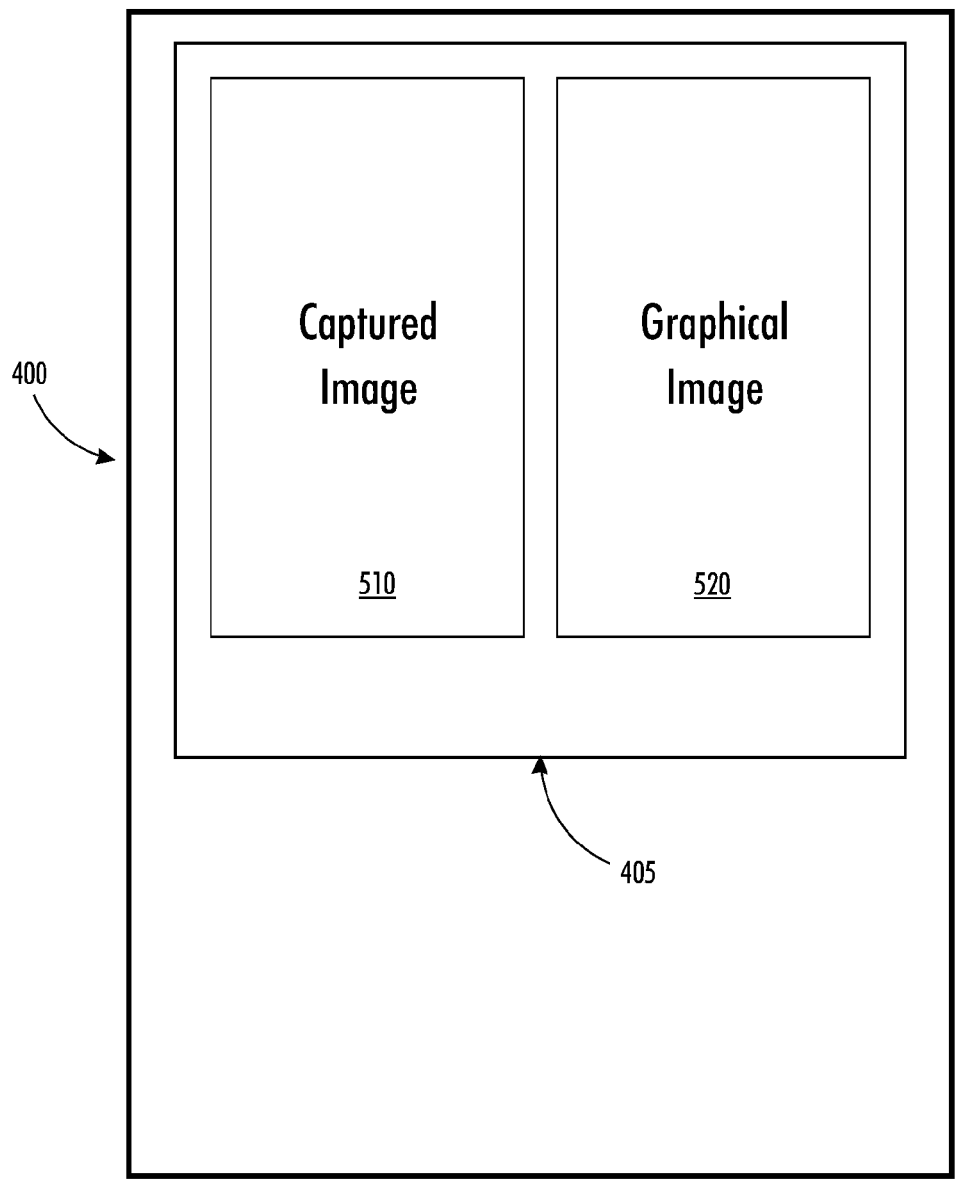
FIG. 5A illustrates a first exemplary display of a captured and graphical image.
Figure 5B:
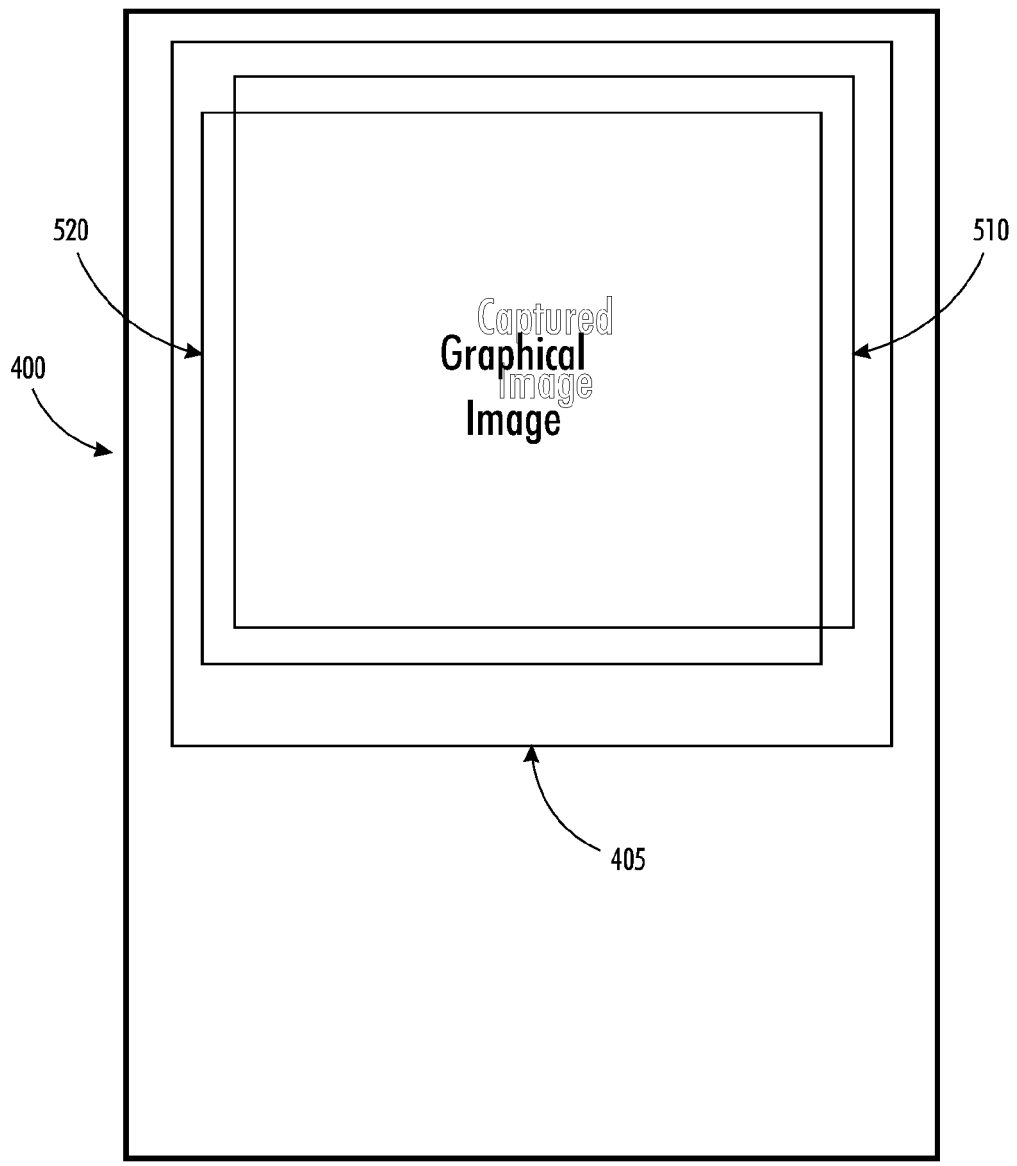
FIG. 5B illustrates a second exemplary display of a captured and graphical image.
Figure 5C:
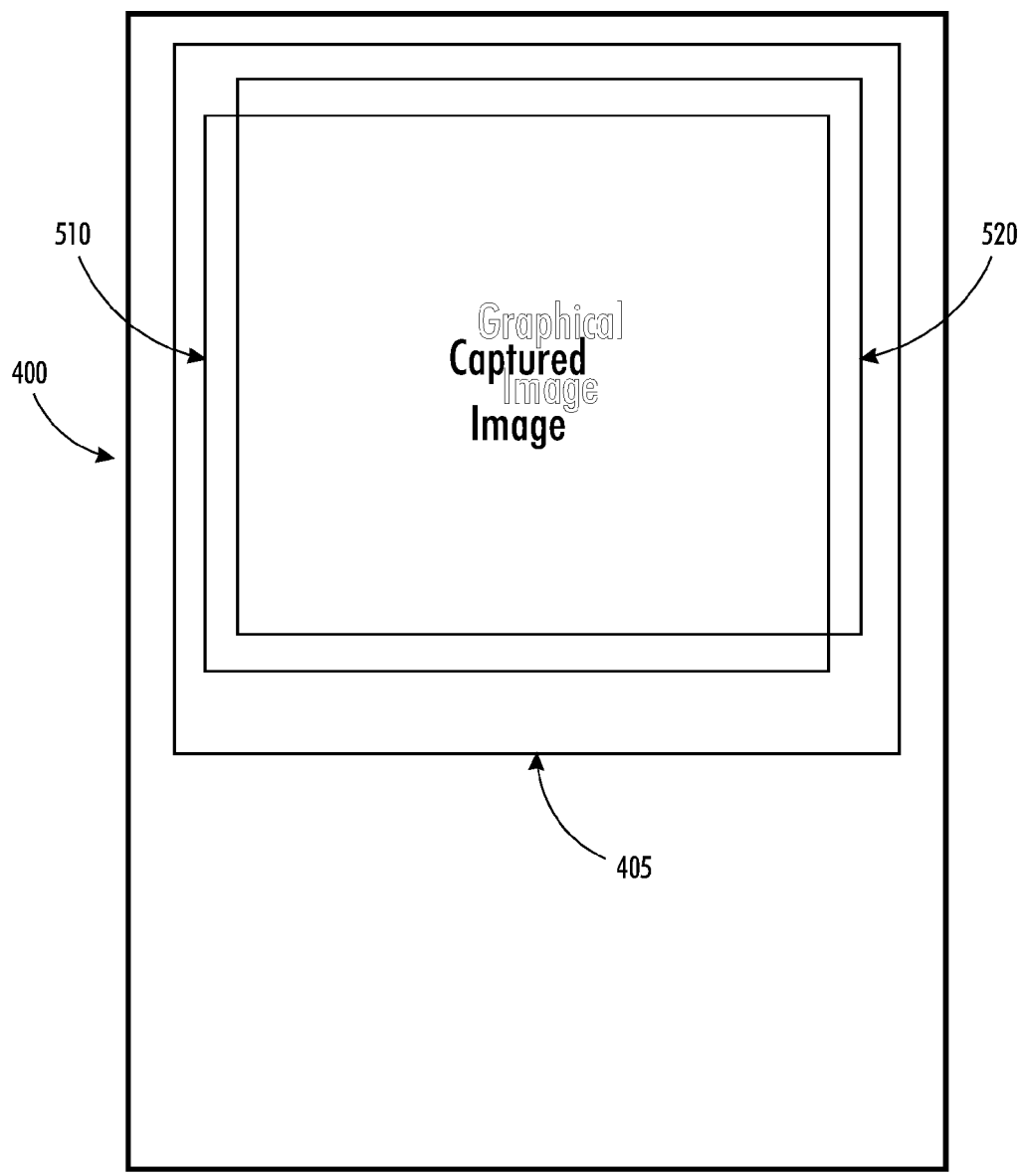
FIG. 5C illustrates a third exemplary display of a captured and graphical image.

In one embodiment, the retrieved graphical image of the area of the multifunction device to be serviced and the image captured by the user's activation of the handheld device are concurrently displayed in a side-by-side or overlaid configuration where the graphical image is overlaid on the captured image or the captured image is overlaid on the graphical image. Referring to FIGS. 5*a*, 5*b*, and 5*c*, on receiving the error code or other information defining the malfunction, the system may prompt the user to open the multifunction device, or otherwise access the internal functional areas of the multifunction device, and take a picture of the area to be serviced using a camera built into the handheld. The picture, or captured image, 510 is then analyzed by the system and used to search a database for a relevant graphic, such as a diagram or illustration, 520 that can be displayed in conjunction with the captured image 510. In one embodiment, shown in FIG. 5*a*, the captured image 510 and graphical image 520 are displayed side-by-side. In another embodiment, shown in FIG. 5*b*, the graphical image 520 is overlaid atop the captured image 510. In another embodiment, shown in FIG. 5*c*, the captured image 510 is overlaid atop the graphical image 520.

Figure 4E:
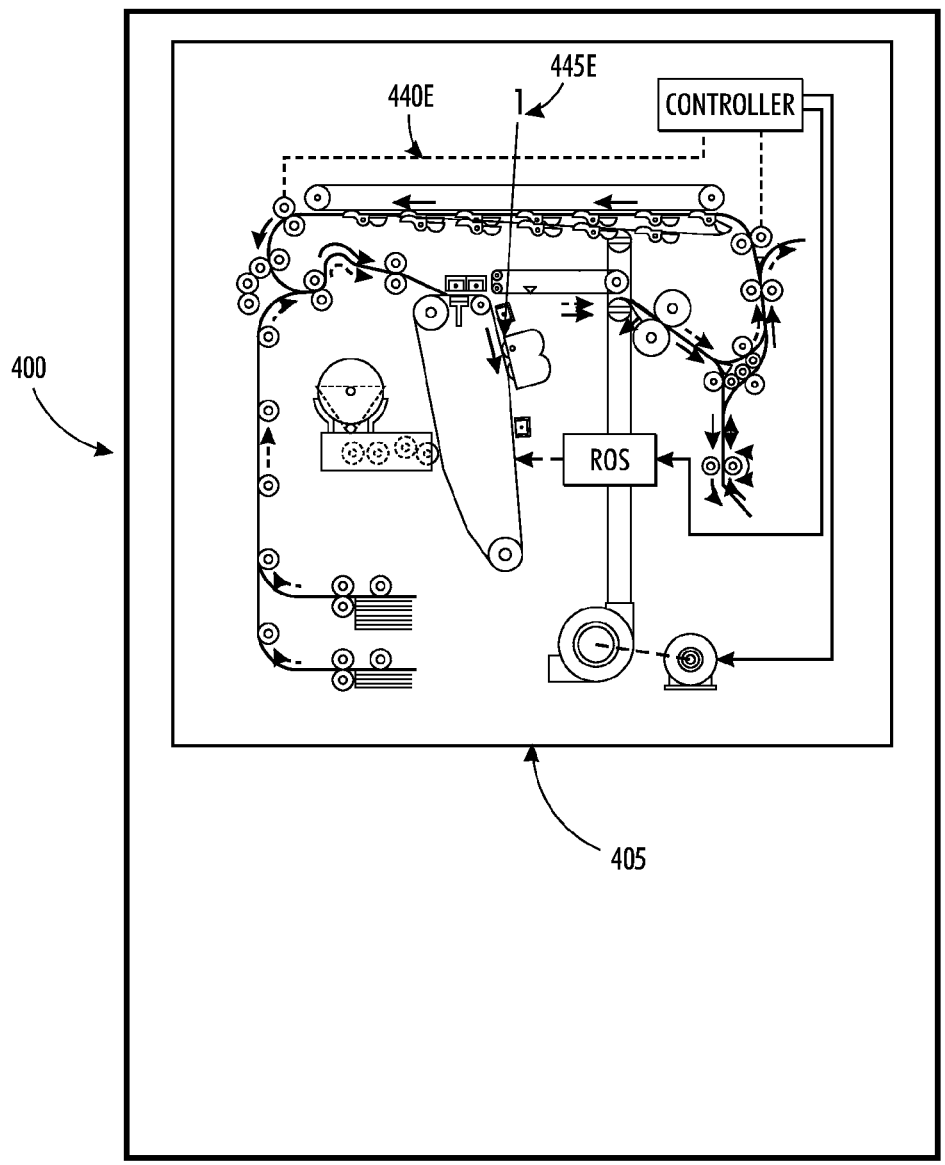
FIG. 4E is an exemplary embodiment of a fifth graphical user interface.
Figure 4F:
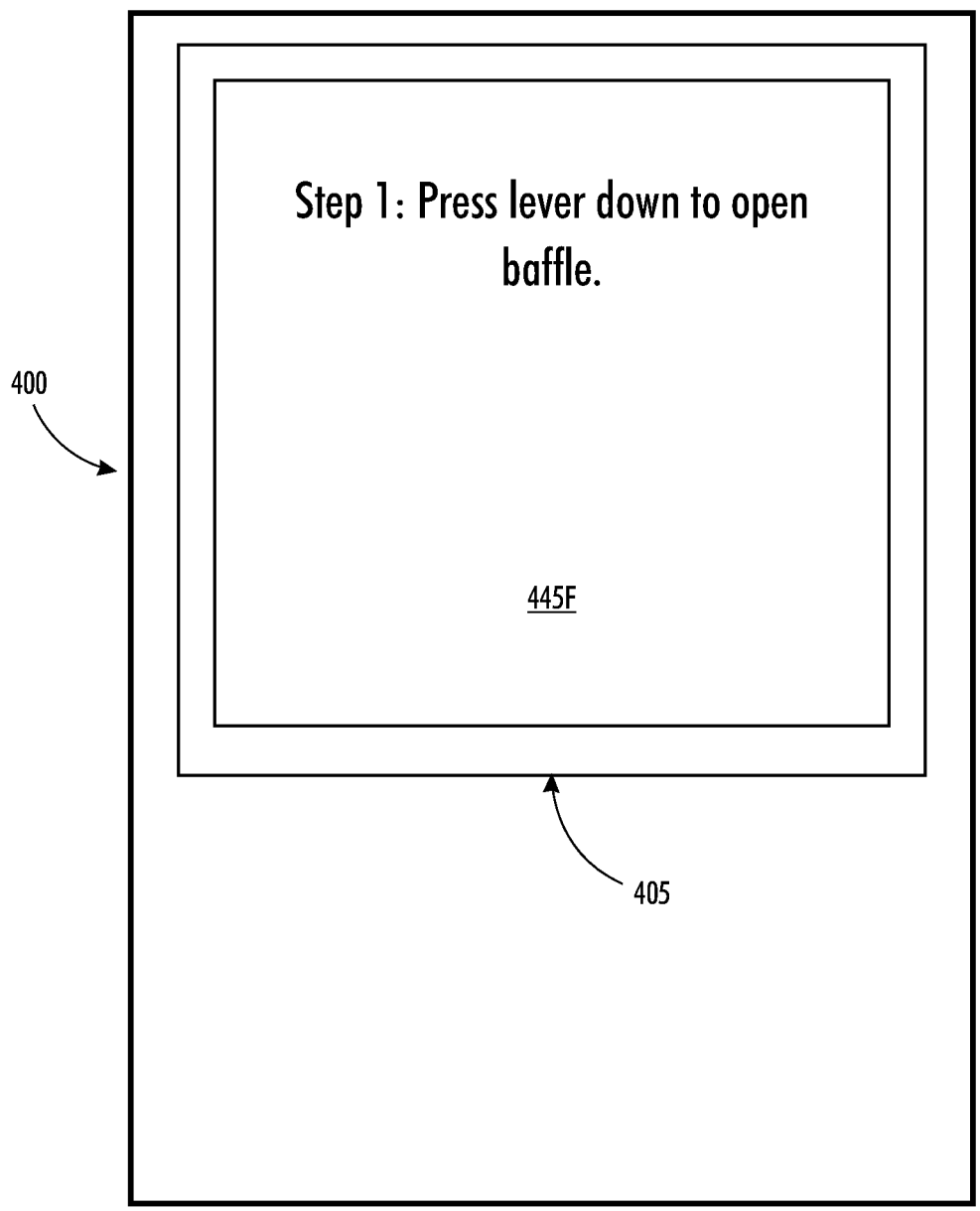
FIG. 4F is an exemplary embodiment of a sixth graphical user interface.

Assuming the user clicks to approve the display, referring to FIGS. 3 and 4E, the application obtains 308 a diagram or graphic 440E of the system, retrieved from a database or received from the device, based upon the captured image of the device (or the captured imaged itself) and further overlays an indicator of a first instruction step 445E to be performed by a user or servicer of the device. It should be appreciated that the diagram or graphic of the system may incorporate the indicator, thereby not requiring the application to separately overlay an indicator. It should further be appreciated that application may retrieve a plurality of graphics, each associated with a different troubleshooting step, and each of which may already comprise an indicator that serves to visually direct a user to address a specific portion of the service area.

To the extent an overlay is used, the overlay may occur in a number of different ways, including a) overlaying an animation of what actions a user should take over the captured image or retrieved graphic, b) overlaying an outline of the affected area over the captured image or retrieved graphic, together with text instructions of how to repair the affected area, c) overlaying an outline of the affected area over the captured image or retrieved graphic, together with auditory instructions of how to repair the affected area, or d) any combination thereof. In one embodiment, a user can select the first step, i.e. icon 445E, or press a "continue" or "next button" to go to an auditory or written instruction 445F, shown in FIG. 4F.

Figure 4G:
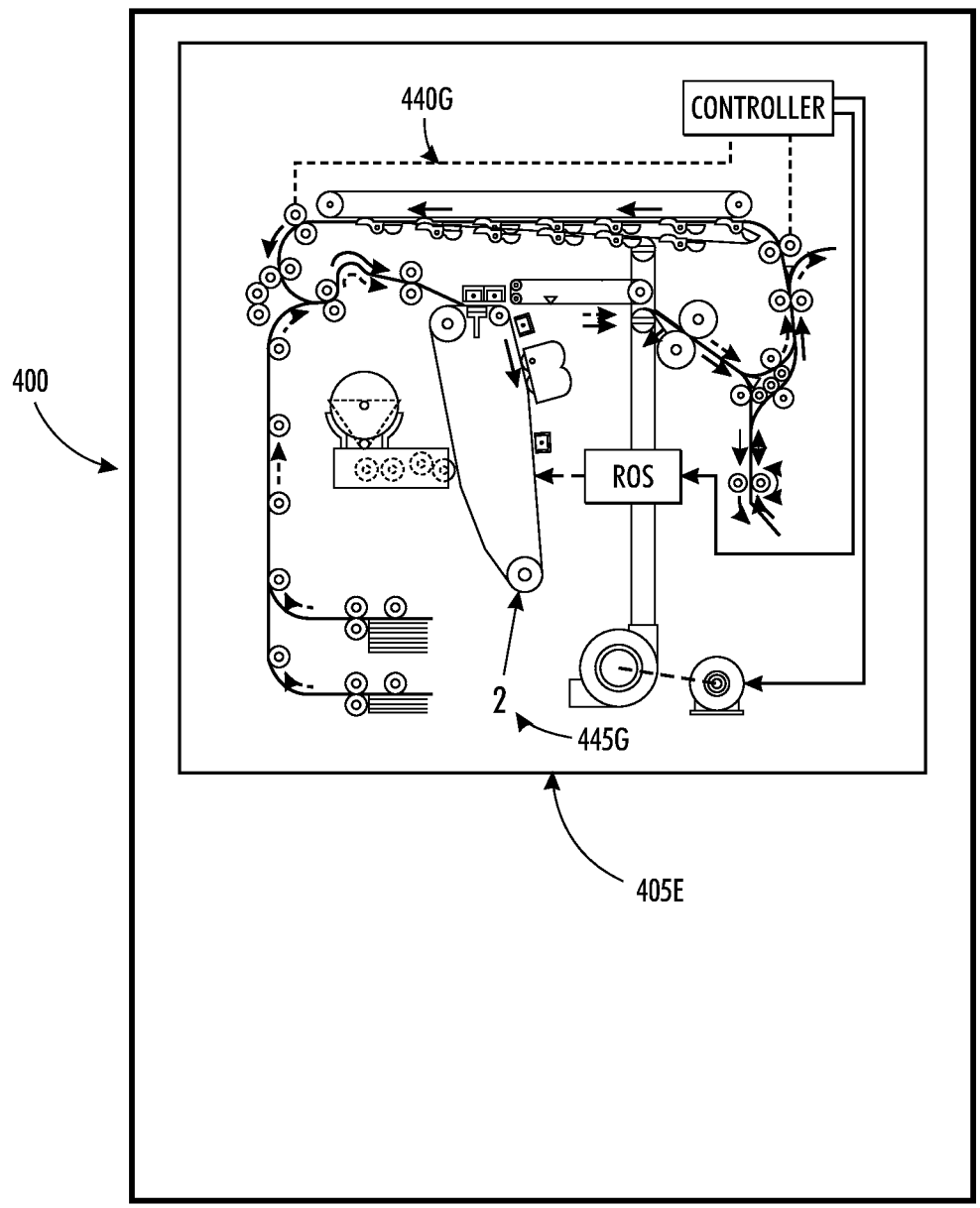
FIG. 4G is an exemplary embodiment of a seventh graphical user interface.
Figure 4H:
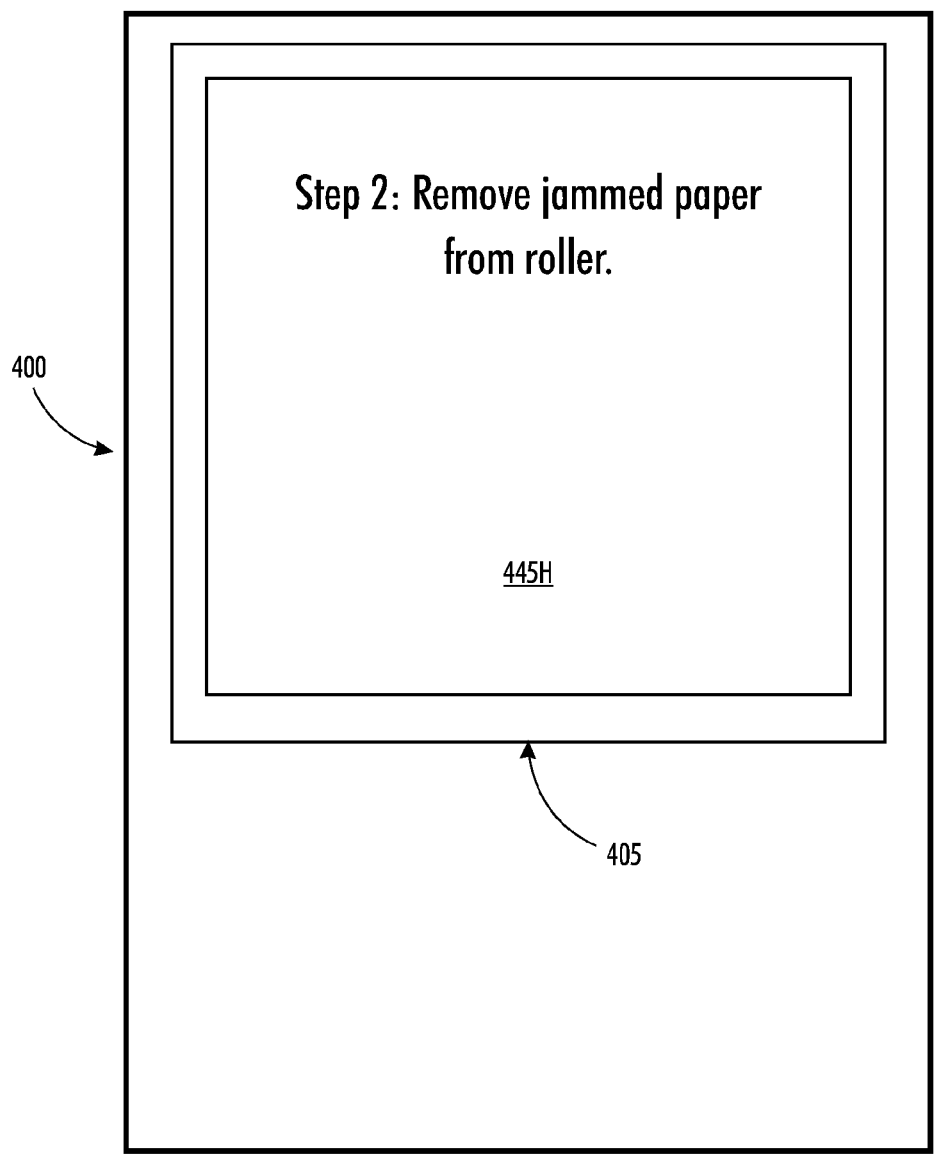
FIG. 4H is an exemplary embodiment of a eighth graphical user interface.
Figure 4I:
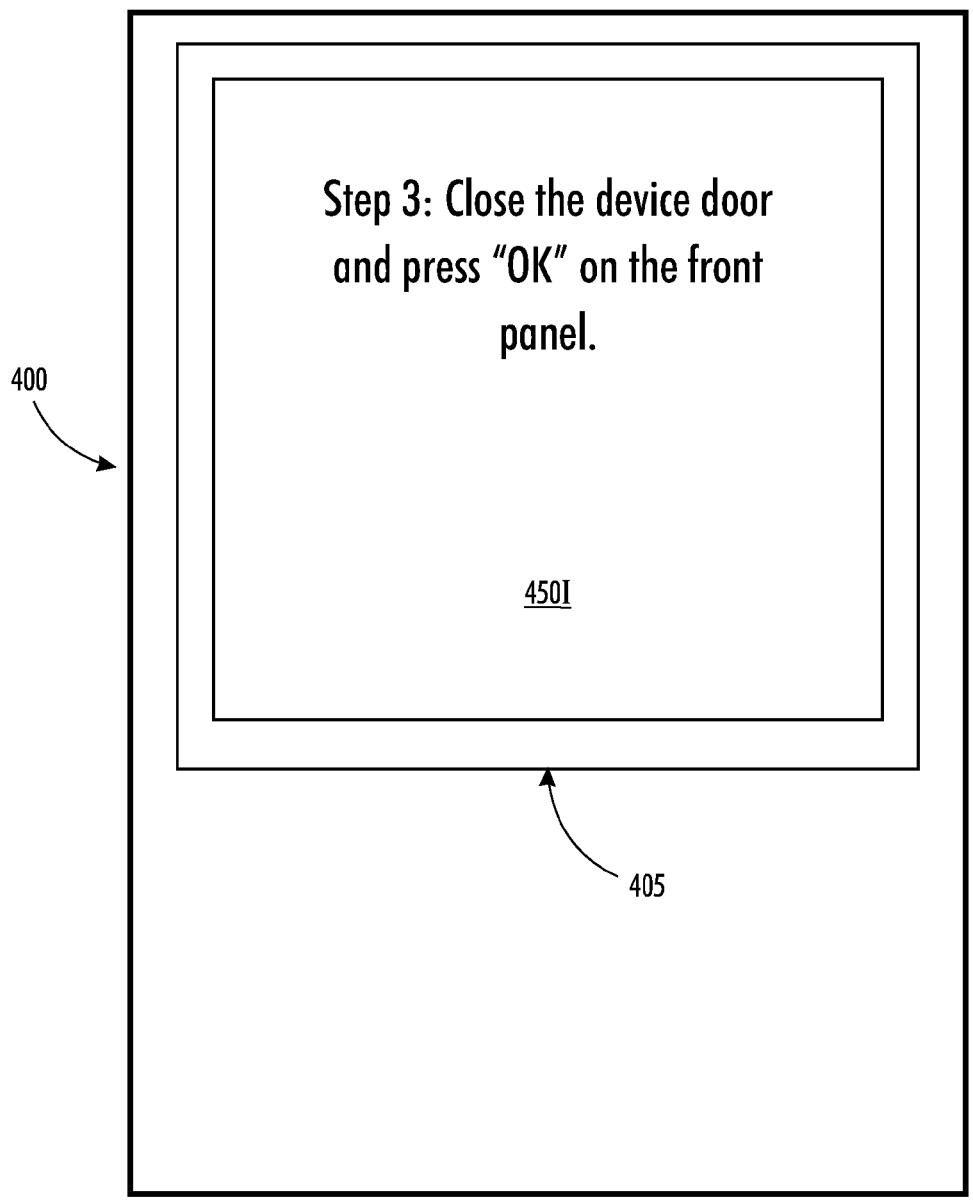
FIG. 4I is an exemplary embodiment of a ninth graphical user interface.

After confirming completion of the first step 445F, the application may then display as second step 445G, shown in FIGS. 4G and 4H, which provide a subsequent instruction 445H to the user. It should be appreciated that this process can be repeated, to yield multiple instruction images, text instructions, and/or auditory instructions. After a user completes the instruction sequence, a final instruction may be displayed 4501, instructing the user to close the device door and reset the multifunction device by, for example, pressing "OK".

In another embodiment, the application executing on the handheld can concurrently monitor the user's progress toward troubleshooting the multifunction device error. Referring back to FIG. 3, the application may periodically instruct a user to position the handheld in order to retake 309 camera images, as discussed above, after a user performs one or more of the instructed steps. By capturing images as the user progresses through the sequence of instructions, the application can confirm that the user is taking the appropriate actions.

For example, if a user responds to a first instruction 445E, as shown in FIG. 4E, by moving the wrong component, a second captured image, which would be obtained by inserting a user instruction to position the handheld camera and activate an image capture process, could be used to provide corrective instructions by a) comparing the second captured image to the first captured image, b) determining a difference between the two images, c) equating the difference between the two images to a moved, modified, or otherwise changed component state by isolating the plurality of pixels representing the delta change between the images and identifying those isolated pixels within a device diagram obtained from the local or remote database, d) determining the identity of a device component equating to the isolated pixels, and e) referencing the most recent prior instruction given to the user, either from local cache or from the local or remote database, to determine if the modified component was the proper component to modify. Where the captured images are first used to identify corresponding graphics or diagrams, the second captured image may be used to retrieve a corresponding graphic or may be compared to the next expected graphic in a sequence of troubleshooting graphic images. If the second captured image does not match the expected graphic (namely the resulting image that should have been created had the prior instruction been properly executed), the application may conclude that the user has not taken the appropriate troubleshooting measures.

More specifically, if the verification process determines that the user has not taken the proper steps, the application will provide 311 corrective instructions to the user by a) determining what component was improperly modified, as described above, b) instructing the user to reverse his or her actions, thereby placing the improperly modified component into its prior state, and c) repeating its prior instruction with the target component highlighted and the improperly modified component "grayed out" or otherwise distinguished to assist the user in not making the same mistake again.

If the verification process, which may occur repeatedly in the course of a troubleshooting session, determines 310 that the user executed the prior instruction properly, it may proceed to a subsequent set of instructions or, if completed, instruct a user to close the device door. Upon closing the device door, the application on the handheld may query the multifunction device or may listen for a communication from the multifunction device for some indication that the error has cleared. Alternatively, the application may prompt the user for an input indicating whether the error has cleared, based on input received from the multifunction device. If the error has not cleared 312, the application may repeat the process by requesting the user to open the device, capture 307 an image of the internal device, create 308 the overlayed set of instructions, and perform the verification steps 309, 311, 310. It should be appreciated that the image capture verification process may be unnecessary if the multifunction device can communicate, in real-time, whether a user is modifying, correcting, or otherwise addressing the proper components to the handheld application executing on the handheld device.

In one embodiment, the application on the handheld logs all error data to a server, to assist maintenance or future troubleshooting. In one embodiment, the application software is configured to send the log data for all error states and actions taken directly to a help desk.

The present system allows a general office worker to fix common errors by themselves, without necessarily relying on technical personnel for every problem. Thus, in case of a jam for example, the system enables a user to correctly locate the problem area, move any components if required and removed the jammed sheets from the machine. One of ordinary skill in the art would appreciate that the system may also be used by technical personnel, in which case it would help them save time and effort in repair or service jobs.

Although described above in connection with particular embodiments disclosed herein, it should be understood the descriptions of the embodiments are illustrative and are not intended to be limiting. Various modifications and applications may occur to those skilled in the art without departing from the true spirit and scope of the specification as defined in the appended claims.

We claim:

1. A handheld device comprising a non-transitory computer readable medium storing a plurality of programmatic instructions adapted to be executed on said handheld device, wherein, when executed, said plurality of programmatic instructions cause the handheld device to:

receive data indicative of an error state in a multifunction device;

prompt a user to activate said handheld device to capture a first image of an area of the multifunction device which is malfunctioning and would need to be serviced to address said error state;

obtain from a memory a second image representative of a procedure to correct an error in said area of the multifunction device which would need to be serviced to address said error state;

cause said handheld device to concurrently display said first image and said second image;

determine a plurality of instructions for addressing said error state, wherein said instructions comprise at least one of audio data, video data, text data, or graphical data;

cause said handheld device to display said plurality of instructions in relation to said first image and said second image; and validating a completed instruction after a user confirms a completion of an instruction by a) instructing the user to activate an image capture process in the handheld camera to obtain a second captured image, b) comparing the second captured image to the first image, c) determining a difference between the second captured image and first image, d) equating the difference between the second captured image and first image to a changed component state by isolating a plurality of pixels representing a delta change between the second captured image and first image and identifying the isolated pixels, e) determining an identity of a device component equating to the isolated pixels, and f) referencing a most recent prior instruction given to the user to determine if the device component was a proper component to change.

2. The handheld device of claim 1 wherein the plurality of programmatic instructions causing the handheld device to receive data indicative of the error state comprise routines for causing said handheld device to wirelessly communicate with said multifunction device and to obtain said data indicative of the error state from said multifunction device.

3. The handheld device of claim 1 wherein said data indicative of the error state comprises at least one of an error code, a type of multifunction device, or a type of error.

4. The handheld device of claim 1 wherein said handheld device captures the first image using a camera integrated into the handheld device.

5. The handheld device of claim 4 wherein the plurality of programmatic instructions causing said handheld device to display said plurality of instructions in relation to said first image and said second image further cause said handheld device to overlay at least one of said text data or graphical data on said first and said second image.

6. The handheld device of claim 1 wherein the plurality of programmatic instructions causing the handheld device to obtain from a memory a second image representative of an area of the multifunction device which would need to be serviced to address said error state comprise routines for retrieving a graphical image of the area of multifunction device, which would need to be serviced to address said error state, wherein said graphical image is stored in a database.

7. The handheld device of claim 6 wherein the graphical image is retrieved by analyzing the first image and identifying at least one graphical image in the database corresponding to said first image.

8. The handheld device of claim 6 wherein the graphical image is retrieved by using said data indicative of the error state and querying the database for a graphical image associated with said error state.

9. The handheld device of claim 6 wherein the plurality of programmatic instructions for causing said handheld device to display said plurality of instructions in relation to said first image and said second image cause said handheld device to overlay at least one of said text data or graphical data on said graphical image.

10. The handheld device of claim 1 wherein said error state is a sheet of paper being jammed within the multifunction device.

11. The handheld device of claim 1 wherein said concurrent display comprises overlaying the first image atop the second image or overlaying the second image atop the first image.

12. A method of instructing a user to troubleshoot a malfunction in a multifunction device using a handheld device, wherein said handheld device executes a plurality of programmatic instructions, comprising:

receiving data indicative of a malfunction in a multifunction device;

prompting a user to capture a first image of an area of the multifunction device which is malfunctioning and would need to be serviced to address said malfunction;

obtaining from a memory a second image representative of a procedure to correct an error in said area of the multifunction device which would need to be serviced to address said malfunction;

causing said handheld device to concurrently display said first image and said image, wherein said concurrent display comprises at least one of overlaying the first image atop the second image or overlaying the second image atop the first image;

determining a plurality of instructions for addressing said malfunction, wherein said instructions comprise at least one of audio data, video data, text data, or graphical data;

causing said handheld device to display said plurality of instructions in relation to said first image and said second image; and validating a completed instruction after a user confirms a completion of an instruction by a) instructing the user to activate an image capture process in the handheld camera to obtain a second captured image, b) comparing the second captured image to the first image, c) determining a difference between the second captured image and first image, d) equating the difference between the second captured image and first image to a changed component state by isolating a plurality of pixels representing a delta change between the second captured image and first image and identifying the isolated pixels, e) determining an identity of a device component equating to the isolated pixels, and f) referencing a most recent prior instruction given to the user to determine if the device component was a proper component to change.

13. The method of claim 12 wherein receiving data indicative of the error state is performed by causing said handheld device to wirelessly communicate with said multifunction device and to obtain said data indicative of the malfunction from said multifunction device.

14. The method of claim 12 wherein said memory is at least one of a memory local to said handheld device, a memory local to said multifunction device, or a memory remote from said handheld device and said multifunction device and accessible via a network communication.

15. The method of claim 12 wherein said handheld device captures the first image using a camera integrated into the handheld device.

16. The method of claim 15 further comprising overlaying at least one of said text data or graphical data on said first and second image.

17. The method of claim 12 wherein obtaining from the memory the second image comprises retrieving a graphical image of the area of multifunction device, which would need to be serviced to address said malfunction, wherein said graphical image is stored in a database.

18. The method of claim 17 further comprising retrieving the graphical image by analyzing the first image and identifying at least one graphical image in the database corresponding to said first image.

19. The method of claim 17 further comprising retrieving the graphical image by using said data indicative of the malfunction and querying the database for a graphical image associated with said malfunction.

20. The method of claim 17 further comprising overlaying at least one of said text data or graphical data on said graphical image.

\* \* \* \* \*